(12) United States Patent
Raval et al.

(10) Patent No.: US 11,977,526 B2
(45) Date of Patent: May 7, 2024

(54) SYSTEMS AND METHODS FOR GENERATING MICRODATABASES

(71) Applicant: Verizon Patent and Licensing Inc., Basking Ridge, NJ (US)

(72) Inventors: Anand Girishbhai Raval, Irving, TX (US); Jill M. Hedrick, Colorado Springs, CO (US); Sinh V. Nguyen, Plano, TX (US); Vijayasarathi Chennamsetty, Hyderabad (IN); Kaushik Narayanan, Tampa, FL (US); Shatarupa S. Purohit, Allen, TX (US); Anil Chintalapudi, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 188 days.

(21) Appl. No.: 17/451,971

(22) Filed: Oct. 22, 2021

(65) Prior Publication Data
US 2023/0129569 A1 Apr. 27, 2023

(51) Int. Cl.
*G06F 16/215* (2019.01)
*G06F 16/23* (2019.01)
*G06F 21/62* (2013.01)

(52) U.S. Cl.
CPC ........ *G06F 16/215* (2019.01); *G06F 16/2379* (2019.01); *G06F 21/6218* (2013.01)

(58) Field of Classification Search
CPC .............. G06F 16/215; G06F 16/2379; G06F 21/6218; G06F 16/211; G06F 16/25; G06F 16/23; G06F 21/62; G06F 16/21
See application file for complete search history.

(56) References Cited

U.S. PATENT DOCUMENTS

| 6,330,555 | B1 * | 12/2001 | Weber | G06F 16/278 |
| | | | | 707/999.009 |
| 7,606,813 | B1 * | 10/2009 | Gritsay | G06F 16/25 |
| 10,387,384 | B1 * | 8/2019 | Bent | G06F 16/185 |
| 2015/0134699 | A1 * | 5/2015 | Bhide | H04L 67/1097 |
| | | | | 707/781 |
| 2019/0108229 | A1 * | 4/2019 | Sista | G06F 16/2282 |
| 2019/0361759 | A1 * | 11/2019 | Haugen | G06F 11/0772 |
| 2022/0382915 | A1 * | 12/2022 | Thomsen | G06F 16/2379 |
| 2023/0171163 | A1 * | 6/2023 | Gudipati | G06F 11/1469 |
| | | | | 709/224 |

FOREIGN PATENT DOCUMENTS

WO WO-2015074382 A1 * 5/2015 .......... G06F 11/1451

\* cited by examiner

*Primary Examiner* — Maher N Algibhah

(57) ABSTRACT

A method includes retrieving first data from a first data store having a first database topology and second data from a second data store having a second database topology. The first data and the second data are stored in a load data set. The load data set is sorted based on a first identifier field. A first microdatabase is loaded with a first portion of the first data associated with a first value of the first identifier field and a first portion of the second data associated with the first value. A second microdatabase is loaded with a second portion of the first data associated with a second value of the first identifier field and a first portion of the second data associated with the second value. A first key map record for the first microdatabase is generated. A second key map record for the second microdatabase is generated.

20 Claims, 10 Drawing Sheets

SYSTEMS AND METHODS FOR GENERATING MICRODATABASES

BACKGROUND

Large entities commonly use multiple heterogeneous data systems, each with their own database topology. After a merger or acquisition, the data systems from the different entities often are maintained separately, generally because migrating data systems is costly and time consuming. However, using multiple data systems also provides challenges with respect to data consistency, configuration control, and speed of access.

BRIEF DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION OF EXAMPLE EMBODIMENTS

Figure 1A:
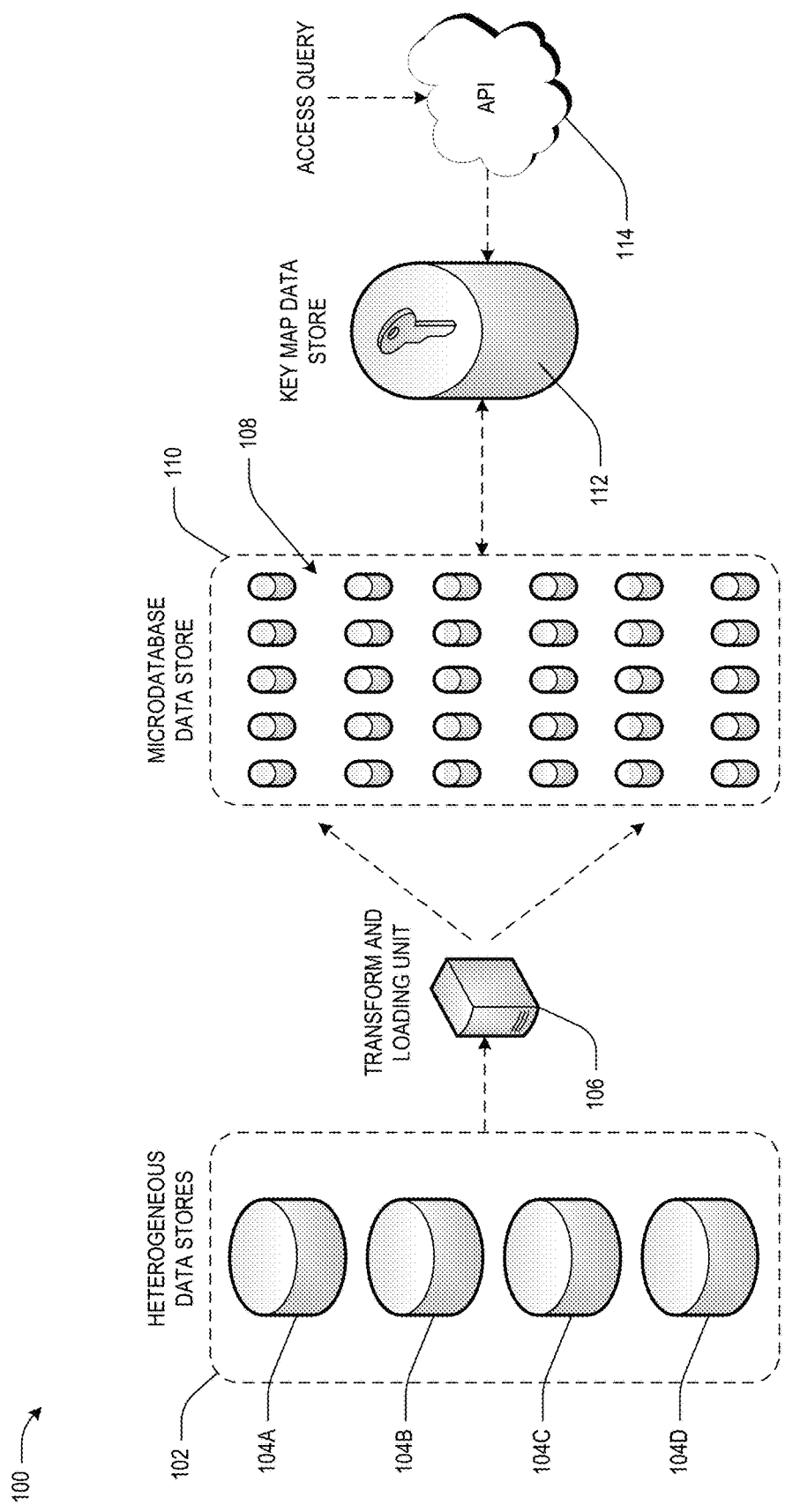
FIGS. 1A and 1B are diagrams of one or more example implementations, according to some embodiments.

Subject matter will now be described more fully hereinafter with reference to the accompanying drawings, which form a part hereof, and which show, by way of illustration, specific example embodiments. This description is not intended as an extensive or detailed discussion of known concepts. Details that are well known may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

The following provides a discussion of some types of computing scenarios in which the disclosed subject matter may be utilized and/or implemented.

In some instances, an entity may maintain use multiple heterogeneous data systems, each with its own database topology. An entity may use different database systems in different business groups or may acquire different database systems after merging or acquiring other entities. For example, one business group may use a data system that employs an Oracle® database topology, while a different business group or acquired entity may employ a structured query language (SQL) database topology. Systems with different database topologies are not easily combined or migrated.

In some embodiments, data from data stores having differing database topologies is accessed and stored in microdatabases. Relationships between identifiers in the data stores are identified and key map records are generated for unique relationships. Each microdatabase includes data from the data stores for a single unique identifier. For example, one data store may include customer information and another data store may include service information for services associated with the customers. In some embodiments, each microdatabase is loaded with the customer and service data for a single customer. In some instances, the customer data store and the service data store may use different identifiers for the same customer. When identifying the relationships, a unique identifier may be associated with the customer identifier and the service identifier and the key map record reflects this association. The key map record also includes an access key, such as a digital decryption key for accessing the microdatabase. A user may query the data using the customer identifier, the service identifier, and or the generated unique identifier. The key map record is accessed to link the query to the appropriate microdatabase and to retrieve the access key. Since the microdatabase includes data only associated with the unique identifier, accessing the microdatabase to retrieve the data may be performed in milliseconds as compared to minutes for a large data store that includes data for all of the distinct identifiers (e.g., all of the customers). In some embodiments, the key map records are stored separately from the data in the microdatabases. Even if the data in the microdatabases is lost due to a system failure, the key map records can be used to reconstruct the microdatabases based on the identified relationships.

Embodiments described herein also include a system including a first data store configured to store first data comprising a first identifier field, a second data store configured to store second data comprising a second identifier field, and a third data store comprising microdatabases. A processor is configured to execute instructions to perform operations including generating a first relationship record that relates a first value of the first identifier field to a first value of the second identifier field, generating a second relationship record that relates a second value of the first identifier field to a second value of the second identifier field, generating a first key map record for the first relationship record, generating a second key map record for the second relationship record, performing a first linking of the first key map record to a first microdatabase of the microdatabases, performing a second linking of the second key map record to a second microdatabase of the microdatabases, loading the first microdatabase with a first portion of the first data from the first data store and a first portion of the second data from the second data store based upon the first linking, loading the second microdatabase with a second portion of the first data from the first data store and a second portion of the second data from the second data store based upon the second linking, receiving a query comprising an identifier value, making a first determination that the first microdatabase is associated with the query based on the identifier value and the first key map record, and retrieving data from the first microdatabase based upon the first determination.

Further aspects of the system comprise a fourth data store configured to store the first key map record and the second key map record. The fourth data store is separate from the first data store and the second data store.

Further aspects of the system comprise generating a first unique identifier for the first value in the first identifier field linked to the first value in the second identifier field based on the first relationship record and generating a second unique identifier for the second value in the first identifier field linked to the second value in the second identifier field based on the second relationship record.

Further aspects of the system comprise generating a load data set comprising a third identifier field storing the first value of the first identifier field, the first value of the second identifier field, the first value of the first identifier field, and the second value of the second identifier, the first portion of the first data from the first data store linked to the first value of the first identifier field, the first portion of the second data from the second data store linked to the first value of the second identifier field, the second portion of the first data from the first data store linked to the second value of the first identifier field, and the second portion of the second data from the second data store linked to the second value of the second identifier field. One of the first value of the first identifier field in the third identifier field or the first value of the second identifier field in the third identifier field is transformed based on the first unique identifier. One of the second value of the first identifier field in the third identifier field or the second value of the second identifier field in the third identifier field is transformed based on the second unique identifier. The load data set is sorted based on the third identifier field to generate a sorted load data set.

In a further aspect of the system, loading the first microdatabase comprises loading the first microdatabase with the first portion of the first data from the first data store and the first portion of the second data from the second data store from the sorted load data set and loading the second microdatabase comprises loading the second microdatabase with the second portion of the first data from the first data store and the second portion of the second data from the second data store from the sorted load data set.

In a further aspect of the system, the first data store comprises a first database topology; and the second data store comprises a second database topology different than the first database topology.

Further aspects of the system comprise performing a validation on the first portion of the first data and modifying at least one element of the first portion of the first data based on a cleansing rule responsive to a failure of the validation.

Further aspects of the system comprise making a second determination that the second microdatabase is not associated with the query based on the identifier value and the second key map record and refraining from retrieving data from the second microdatabase based upon the second determination.

In a further aspect of the system, the first key map record comprises an access key and retrieving data from the first microdatabase comprises retrieving data from the first microdatabase using the access key.

Embodiments described herein also include a method. The method includes retrieving first data from a first data store having a first database topology and second data from a second data store having a second database topology different than the first database topology, storing the first data and the second data in a load data set, sorting the load data set based on a first identifier field in the load data set to generate a first portion of the first data associated with a first value of the first identifier field, a first portion of the second data associated with the first value of the first identifier field, a second portion of the first data associated with a second value of the first identifier field, and a second portion of the second data associated with the second value of the first identifier field, loading a first microdatabase with the first portion of the first data and the first portion of the second data, loading a second microdatabase with the second portion of the first data and the second portion of the second data, generating a first key map record comprising a first access key for the first microdatabase and linking the first value of the first identifier field to the first microdatabase, and generating a second key map record comprising a second access key for the second microdatabase and linking the second value of the first identifier field to the second microdatabase.

Further aspects of the method comprise receiving a query comprising an identifier value, making a first determination that the first microdatabase is associated with the query based on the identifier value and the first key map record, and retrieving data from the first microdatabase based upon the first determination using the first access key.

Further aspects of the method comprise making a second determination that the second microdatabase is not associated with the query based on the identifier value and the second key map record and refraining from retrieving data from the second microdatabase based upon the second determination.

Further aspects of the method comprise storing the first microdatabase and the second microdatabase in a third data store and storing the first key map record and the second key map record in a fourth data store separate from the third data store.

Further aspects of the method comprise storing one of a second identifier field in the first data store or a third identifier field in the second data store as the first identifier field in the load data set.

In a further aspect of the method, generating the first key map record comprises generating the first key map linking one of a first value of a second identifier field in the first data store or a first value of a third identifier field in the second data store to the first value of the first identifier field in the load data set.

Further aspects of the method comprise performing a validation on the first portion of the first data and modifying at least one element of the first portion of the first data based on a cleansing rule responsive to a failure of the validation.

Embodiments described herein also include a non-transitory computer-readable medium, storing instructions thereon that when executed by a processor cause the processor to retrieve first data from a first data store having a first database topology and second data from a second data store having a second database topology different than the first database topology, store the first data and the second data in a load data set, sort the load data set based on a first identifier field in the load data set to generate a first portion of the first data associated with a first value of the first identifier field, a first portion of the second data associated with the first value of the first identifier field, a second portion of the first data associated with a second value of the first identifier field, and a second portion of the second data associated with the second value of the first identifier field, load a first microdatabase with the first portion of the first data and the first portion of the second data, load a second microdatabase with the second portion of the first data and the second portion of the second data, generate a first key map record comprising a first access key for the first microdatabase and linking the first value of the first identifier field to the first microdatabase, and generate a second key map record comprising a second access key for the second microdatabase and linking the second value of the first identifier field to the second microdatabase.

In a further aspect of the medium, the processor is to receive a query comprising an identifier value, make a first determination that the first microdatabase is associated with the query based on the identifier value and the first key map record, and retrieve data from the first microdatabase using the first access key based upon the first determination.

In a further aspect of the medium, the processor is to make a second determination that the second microdatabase is not associated with the query based on the identifier value and the second key map record and refrain from retrieving data from the second microdatabase based upon the second determination.

In a further aspect of the medium, the processor is to store one of a first identifier field in the first data store or a second identifier field in the second data store as the identifier field in the load data set.

Figure 1B:
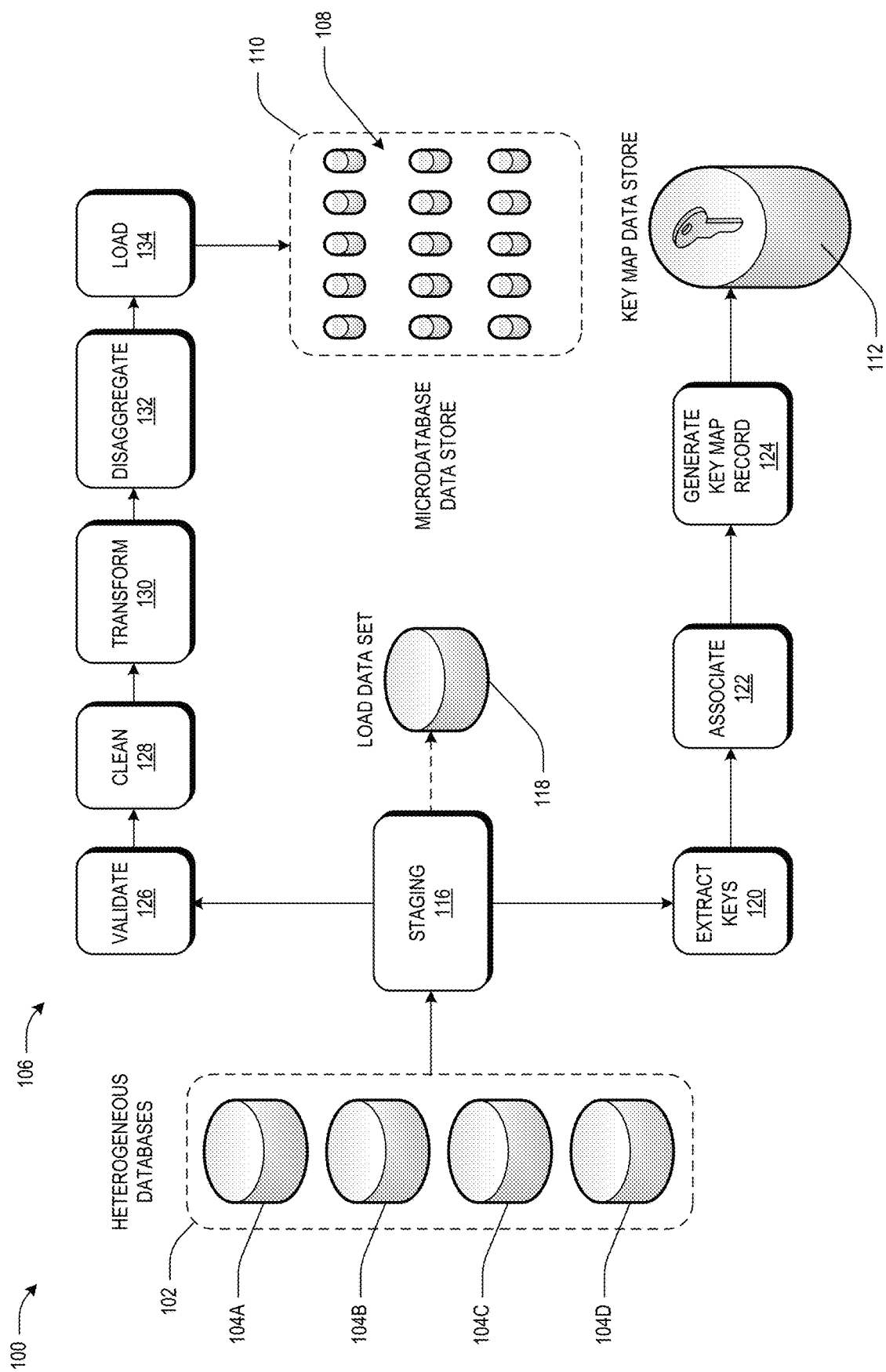

FIGS. 1A-1B are diagrams of one or more example implementations 100, according to some embodiments. Referring to FIGS. 1A-1B, heterogeneous data stores 102, individually referred to as data stores 104A, 104B, 104C, 104D, are accessed by a transform and loading unit 106 to populate microdatabases 108 in a microdatabase data store 110. In some embodiments, the transform and loading unit 106 stores key map records associated with the microdatabases 108 in a key map data store 112. In some embodiments, the key map records comprise identifier information associated with the microdatabases 108 and access keys for accessing the microdatabases 108. Access queries for retrieving data from the microdatabases 108 are received through an application programming interface (API) 114 of the key map data store 112. In some embodiments, the key map data store 112 is separate from the heterogeneous data stores 102 (e.g., stored in an independent data structure). In some database systems keys are stored in the databases, such that if the database is damaged, the keys are also compromised.

The heterogeneous data stores 102 store data according to different database topologies. Example database topologies include Oracle®, ADABUS™, SQL, Files, or some other database topology. The transform and loading unit 106 allows data to be extracted from the heterogeneous data stores 102 according to predefined use cases. For example, a user with a customer service focus may wish to extract data for a particular customer to respond to a customer query or to facilitate calling the customer regarding devices or services. The use case defines what data is to be extracted from the heterogeneous data stores 102 and an identifier. For example, in a customer focused use case, the identifier is a customer identifier. For each unique value of the identifier in the use case, a separate microdatabase 108 is defined. In some instances, the identifiers are not consistent across the heterogeneous data stores 102. For example, the data store 104A and the data store 104B may use different identifiers for the same customer. To allow data aggregation from the heterogeneous data stores 102, the transform and loading unit 106 identifies relationships between the data in the heterogeneous data stores 102 to allow the creation of the key map records to link the identifiers to a microdatabase 108 and to load the microdatabase 108 with the appropriate data.

FIG. 1B illustrates an implementation 100 showing functions performed by the transform and loading unit 106 to create the microdatabases 108 and the key map records, according to some embodiments. At 116, the transform and loading unit 106 performs a staging process to create a load data set 118 including the data from each of the heterogeneous data stores 102 included in the definition of the use case.

Figure 2:
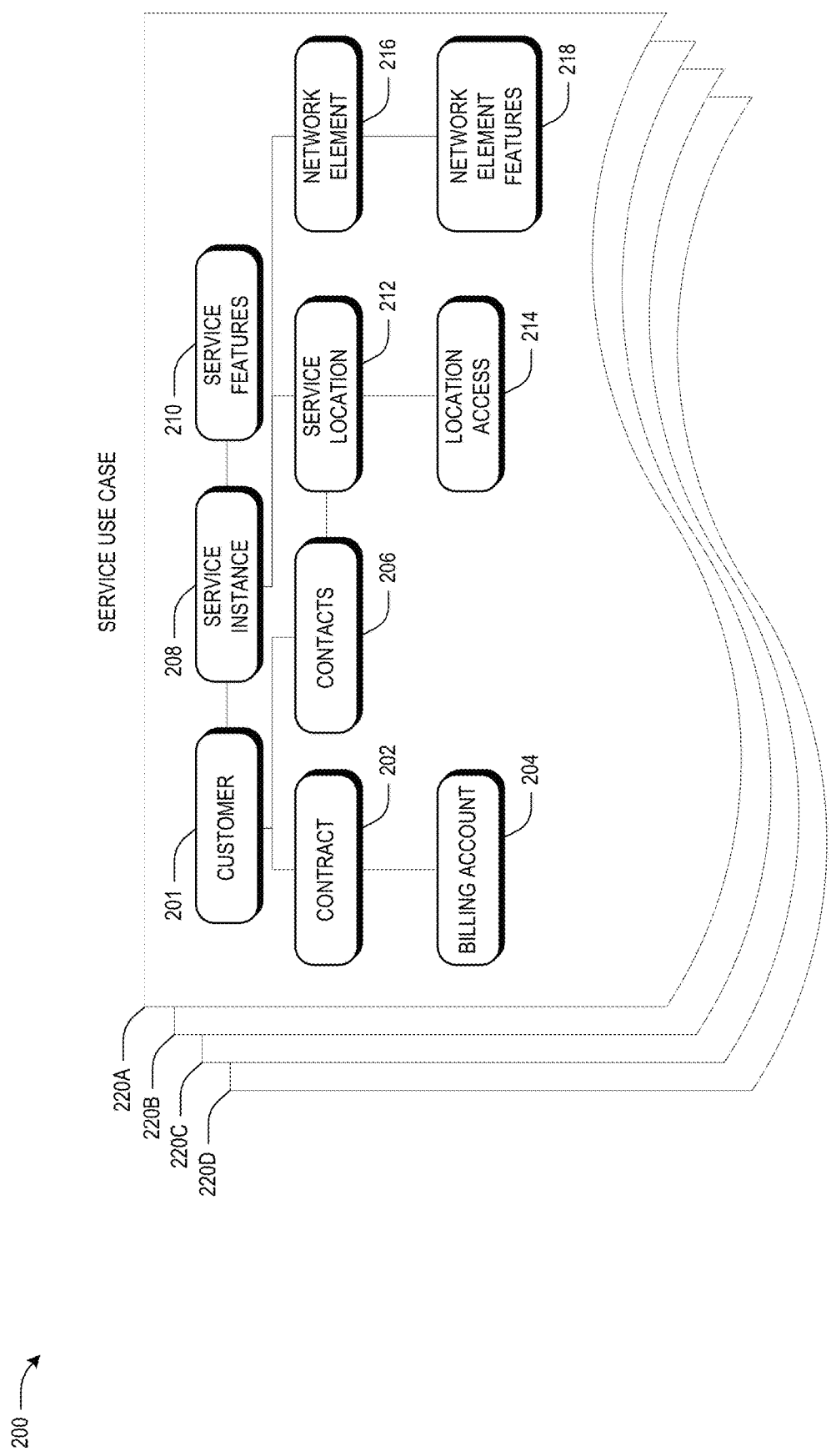
FIGS. 2 and 3 illustrate data tables associated with a service use case, and a customer use case, respectively, according to some embodiments.
Figure 3:
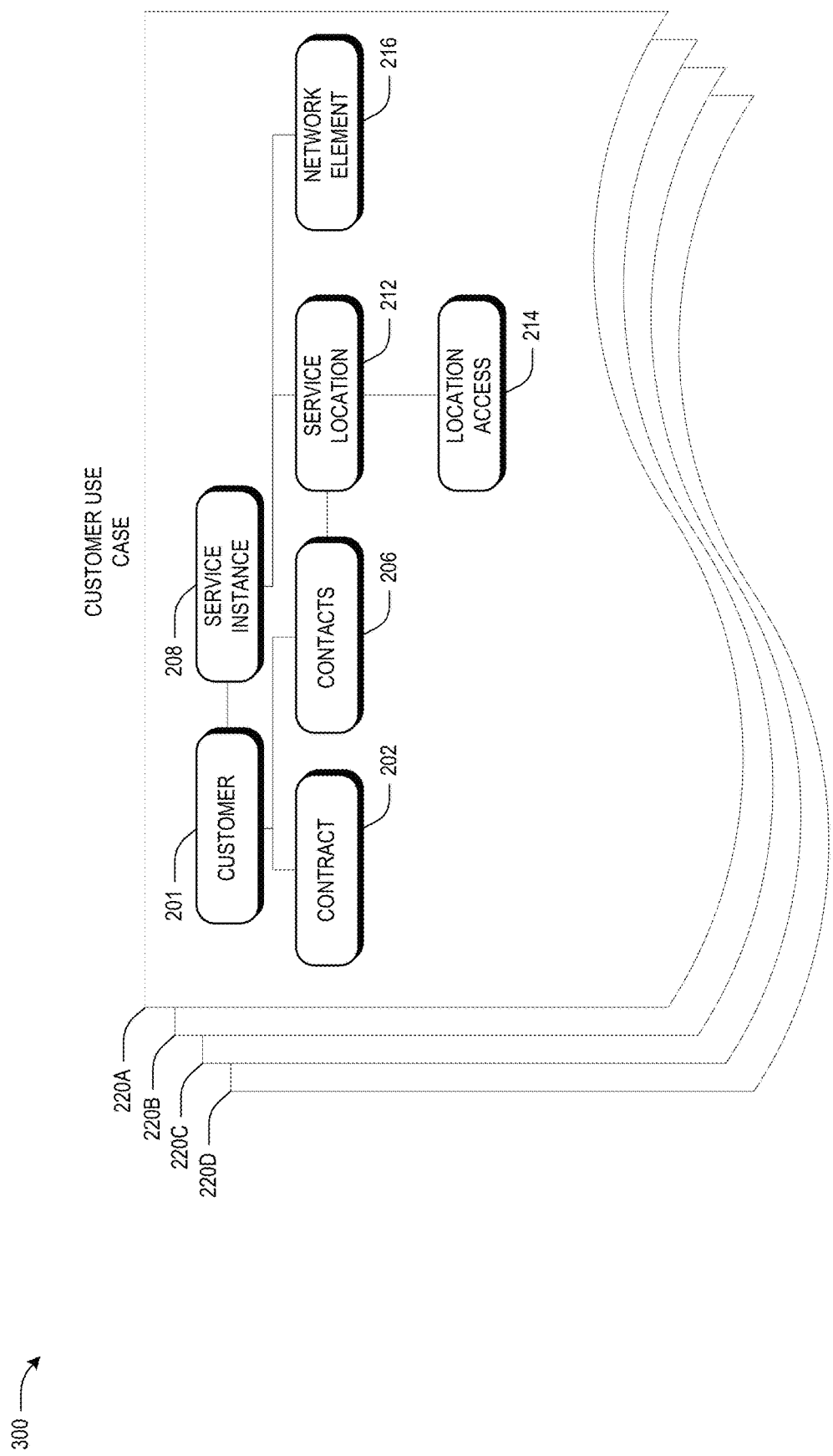

FIGS. 2 and 3 illustrate data tables associated with a service use case 200, and a customer use case 300, respectively, according to some embodiments. The service use case and the customer use case are provided for illustration purposes. Use cases can vary depending on the nature of the entity maintaining the heterogeneous data stores 102.

Referring to FIG. 2, in some embodiments, the service use case employs customer data such as a customer table 201 associated with a particular customer, a contract table 202 including contracts associated with the particular customer, a billing account table 204 defining billing attributes of the particular customer, such as business units and selling segments, and a contacts table 206. In some embodiments, the service use case employs service data such as a service instance table 208 including information about products associated with the customer, a service features table 210 storing information about services provided for the products, a service location table 212 containing information regarding locations for the services, and a location access table 214 identifying access features for locations, such as hours of availability. In some embodiments, the service use case employs network data associated with a telecommunication network, such as a network element table 216 including information about circuits, telephone numbers, or other network elements associated with the services, and a network element features table 218 identifying details about the network elements, such as physical configurations, and logical configurations. Each tab 220A, 220B, 220C, 220D represents portions of the data from the heterogeneous data stores 102 for a different customer. In some embodiments, the customer related tables 201, 202, 204, 206 are stored as first data in a first data store 104A, the service related tables 208, 210, 212, 214 are stored as second data in a second data store 104B, and the network related tables 216, 218 are stored as third data in a third data store 104C. In some embodiments, the distribution of the data across the heterogeneous data stores 102 varies.

Referring to FIG. 3, the customer use case uses data similar to the service use case illustrated in FIG. 2, but the billing account table 204, the service features table 210, and the network element features table 218 are omitted.

FIGS. 2 and 3 illustrates the data after is has been associated with a particular customer. However, when the transform and loading unit 106 performs the staging process at 116 to create the load data set 118 the data tables may not be initially linked to a particular customer due to the use of different identifier values for the same entity. For example, the customer table 201 may include a first identifier field that identifies the customers via first identifier values, and the service instance table 208 may include a second identifier field that identifies the customers via second identifier values that differ from the first identifier values for the same customer. In some embodiments, the transform and loading unit 106 sorts the tables in the load data set 118 based on values of the respective identifier fields.

The transform and loading unit 106 performs an operation to extract keys at 120. In some embodiments, the keys comprise the first identifier field and the second identifier field. The transform and loading unit 106 attempts to map first identifier values to second identifier values using logical rules. For example, contact name, contact address, contact number, or some other data may be used to map first identifier values to second identifier values. In some embodiments, the transform and loading unit 106 creates a unique identifier for each linked pair of first identifier values and second identifier values. In some embodiments, the unique identifier is one of the first identifier values or the second identifier values. In some embodiments, the unique identifier is a new identifier.

The transform and loading unit 106 performs an operation to associate identifiers at 122. In some embodiments, the transform and loading unit 106 creates a relationship record that links first identifier values to second identifier values and the unique identifier values. For example, a relationship record may identify a relationship between a customer ID value, a service ID value, a billing account number ID value, and/or a customer name ID value. One of the ID values may be defined as the unique identifier, or a new unique identifier may be assigned and included in the relationship record. In some embodiments, the relationship records identify dependencies between identifiers. For example, the identifiers may not represent the same entity, but may depend on each other. For example, a private IP service item may depend on an access service item, a private IP service item may use reporting service item, a voice over IP (VOIP) service item may depend on a location service item, or an equipment service item may have a parent-child relationship with a router service item.

The transform and loading unit 106 creates key map records at 124 and stores the key map records in the key map data store 112. In some embodiments, each key map record comprises a relationship record generated above at 122, a microdatabase ID, and an access key for accessing the microdatabase 108. Multiple key map records may reference and contain the access key for the same microdatabase 108. For example, when the load data set 118 comprises data from multiple data stores 104A, 104B, 103C, one key map record may be generated to identify the relationship between the identifier fields in the data stores 104A, 104B, and a second key map record may be generated to identify the relationship between the identifier fields in the data stores 104B, 104C. In some embodiments, the access key comprises a digital decryption key that is employed to decrypt the contents of the microdatabase 108. Without the access key the data in the microdatabase 108 cannot be viewed.

The transform and loading unit 106 performs a validation operation at 126. In some embodiments, the data validation checks data format, field size, or some other attribute.

The transform and loading unit 106 performs a cleansing operation at 128. For data validation failures, the transform and loading unit 106 employs cleansing rules to modify the data. For example, a country code may be changed to USA responsive to the validation failure identifying the use of US or United States. Data fields with different sizes or data types may be modified during the cleansing operation.

The transform and loading unit 106 performs a transformation operation at 130. Based on the relationship records identified during the extract key operation at 120 and the associate operation at 122, the transform and loading unit 106 transforms the values of the identifier fields in the tables of the load data set 118. For example, using the relationship records, all of the identifier field values may be loaded with the unique identifier so all tables are consistent in identifying the particular entity associated with the data. In some embodiments, the transform and loading unit 106 sorts the load data set 118 based on the unique identifier field after transforming the identifiers.

The transform and loading unit 106 performs a disaggregate operation at 132. After the transform operation at 120, the load data set 118 is sorted and the identifiers are consistent. The transform and loading unit 106 generates a microdatabase 108 for each unique value of the identifier field and loads the microdatabase 108 with only the data for that unique value of the identifier field. For example, the data for each tab 220A, 220B, 220C, 220D is stored in a separate microdatabase 108. In some embodiments, each microdatabase 108 comprises a portion of first data from a first data store 104A (e.g., customer data) and a portion of second data from a second data store 104B (e.g., service data). The portions of the first data and the second data for each customer is stored in a separate microdatabase 108. The key map records associated with the particular identifier value may be updated with the microdatabase ID if not assigned at 124. In some embodiments, the transform and loading unit 106 encrypts the contents of the microdatabase using an encryption key that is complementary to the access key stored in the key map record.

Returning to FIG. 1A, an access query may be provided to the key map data store 112 through a call to the API 114. The access query may provide an identifier value that was used in any of the heterogeneous data stores 102. The 114 uses the key map records to make a determination that the identifier value in the access query matches one of the relationship records. Responsive to identifying a match for the access query based on the key map records, the 114 returns the associated microdatabase 108 and the access key. The user may employ the access key to read the associated microdatabase 108 and process the data, for example, to generate a report, display the data on a user interface, populate a document with the data, or some other processing operation.

In some embodiments, the key map data store 112 is separate from the microdatabase data store 110. The key map data store 112 and the microdatabase data store 110 may be stored in different locations, on different hard ware devices, in independent data structures, or some other separation scheme such that deletion or damage to one of the key map data store 112 or the microdatabase data store 110 does not compromise the other of the key map data store 112 or the microdatabase data store 110. As a result, if one of the key map data store 112 or the microdatabase data store 110 is compromised, the other of the key map data store 112 or the microdatabase data store 110 may be used to reconstitute the compromised data.

Figure 4:
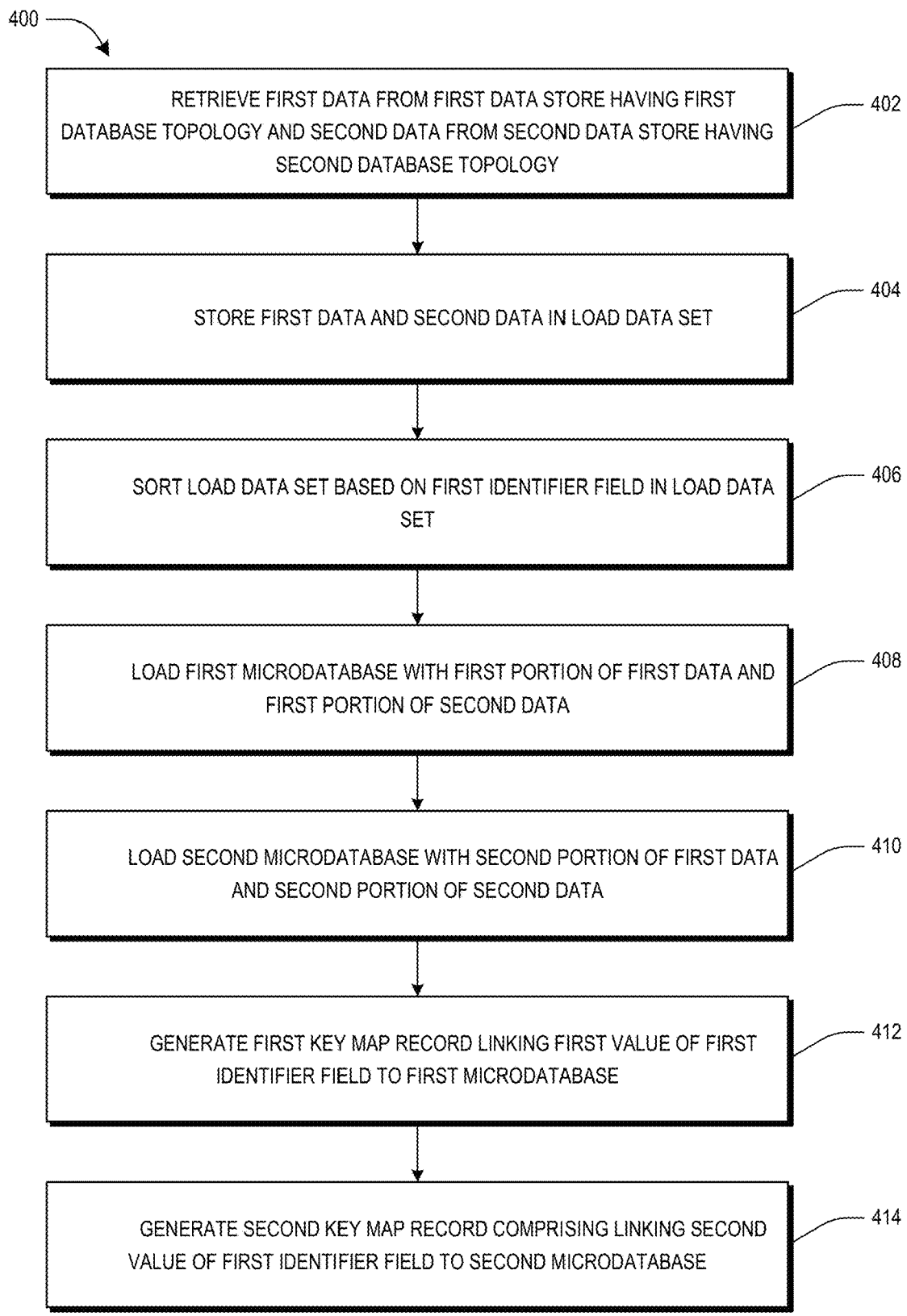
FIG. 4 is a flow chart illustrating an example method for generating microdatabases, according to some embodiments.

FIG. 4 is a flow chart illustrating an example method 400 for generating microdatabases 108, according to some embodiments. At 402, first data is retrieved from a first data store 104A having a first database topology and second data is retrieved from a second data store 104b having a second database topology different than the first database topology. At 404, the first data and the second data are stored in a load data set 118. At 406, the load data set 118 is sorted based on a first identifier field in the load data set 118 to generate a first portion of the first data associated with a first value of the first identifier field, a first portion of the second data associated with the first value of the first identifier field, a second portion of the first data associated with a second value of the first identifier field, and a second portion of the second data associated with the second value of the first identifier field. At 408, a first microdatabase 108 is loaded with the first portion of the first data and the first portion of the second data. At 410, a second microdatabase 108 is loaded with the second portion of the first data and the second portion of the second data. At 412, a first key map record is generated comprising a first access key for the first microdatabase 108 and linking the first value of the first identifier field to the first microdatabase 108. At 412, a second key map record is generated comprising a second access key for the second microdatabase 108 and linking the second value of the first identifier field to the second microdatabase 108.

Figure 5:
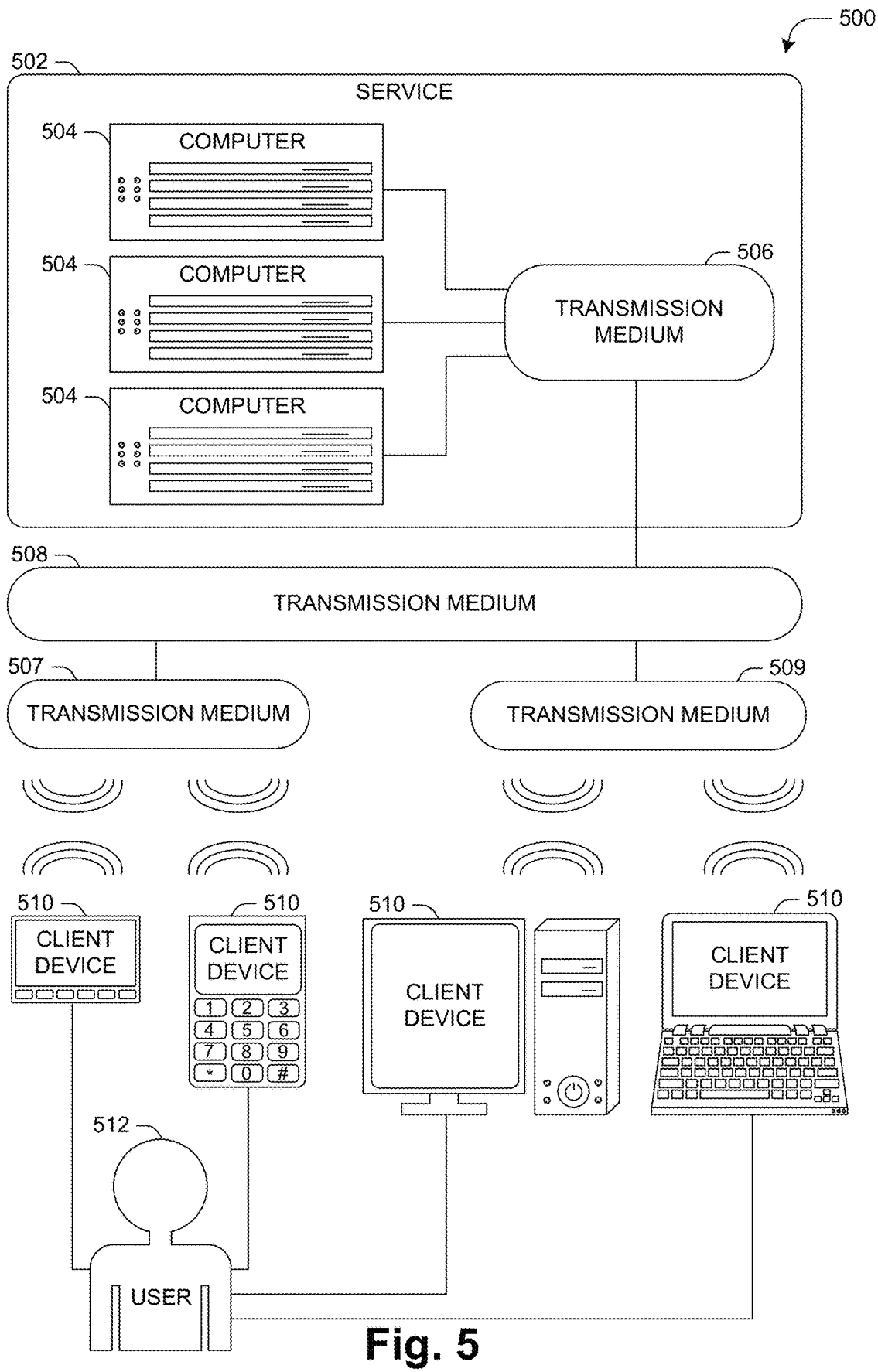
FIG. 5 is an illustration of a scenario involving various examples of transmission mediums that may be used to communicatively couple computers and clients.

In some implementations, one or more process blocks of FIG. 4 may be performed by a device (e.g., transform and loading unit 106). In some implementations, one or more process blocks of FIG. 4 may be performed by another device or a group of devices separate from or including the device, such as a user equipment and/or the like. FIG. 5 is an interaction diagram of a scenario 500 illustrating a service 502 provided by a set of computers 504 to a set of client devices 510 via various types of transmission mediums. The computers 504 and/or client devices 510 may be capable of transmitting, receiving, processing, and/or storing many types of signals, such as in memory as physical memory states.

The computers 504 of the service 502 may be communicatively coupled together, such as for exchange of communications using a transmission medium 506. The transmission medium 506 may be organized according to one or more network architectures, such as computer/client, peer-to-peer, and/or mesh architectures, and/or a variety of roles, such as administrative computers, authentication computers, security monitor computers, data stores for objects such as files and databases, business logic computers, time synchronization computers, and/or front-end computers providing a user-facing interface for the service 502.

Likewise, the transmission medium 506 may comprise one or more sub-networks, such as may employ different architectures, may be compliant or compatible with differing protocols and/or may interoperate within the transmission medium 506. Additionally, various types of transmission medium 506 may be interconnected (e.g., a router may provide a link between otherwise separate and independent transmission medium 506).

In scenario 500 of FIG. 5, the transmission medium 506 of the service 502 is connected to a transmission medium 508 that allows the service 502 to exchange data with other services 502 and/or client devices 510. The transmission medium 508 may encompass various combinations of devices with varying levels of distribution and exposure, such as a public wide-area network and/or a private network (e.g., a virtual private network (VPN) of a distributed enterprise).

In the scenario 500 of FIG. 5, the service 502 may be accessed via the transmission medium 508 by a user 512 of one or more client devices 510, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 510 may communicate with the service 502 via various communicative couplings to the transmission medium 508. As a first such example, one or more client devices 510 may comprise a cellular communicator and may communicate with the service 502 by connecting to the transmission medium 508 via a transmission medium 507 provided by a cellular provider. As a second such example, one or more client devices 510 may communicate with the service 502 by connecting to the transmission medium 508 via a transmission medium 509 provided by a location such as the user's home or workplace (e.g., a Wi-Fi (Institute of Electrical and Electronics Engineers (IEEE) Standard 802.11) network or a Bluetooth (IEEE Standard 802.15.1) personal area network). In this manner, the computers 504 and the client devices 510 may communicate over various types of transmission mediums.

Figure 6:
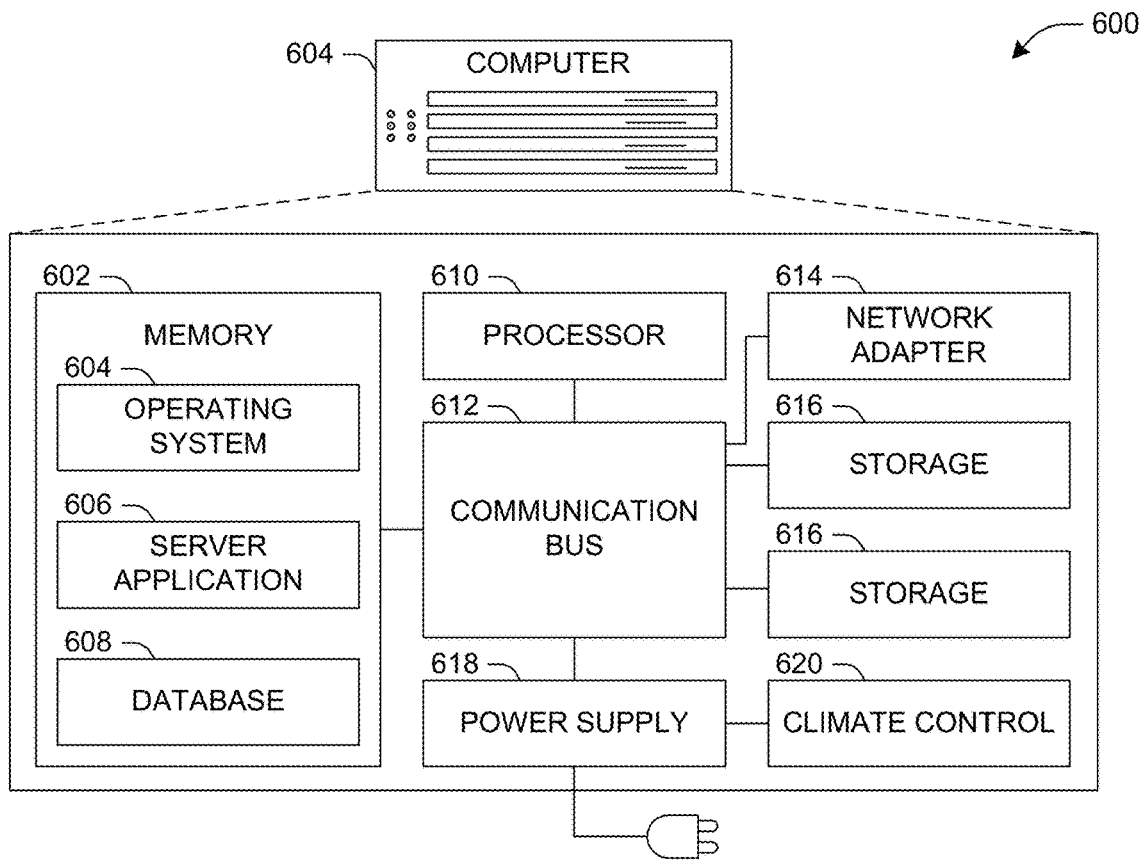
FIG. 6 is an illustration of a scenario involving an example configuration of a computer that may utilize and/or implement at least a portion of the techniques presented herein.

FIG. 6 presents a schematic architecture diagram 600 of a computer 604 that may utilize at least a portion of the techniques provided herein. Such a computer 604 may vary widely in configuration or capabilities, alone or in conjunction with other computers, in order to provide a service such as the service 502.

The computer 604 may comprise one or more processors 610 that process instructions. The one or more processors 610 may optionally include a plurality of cores; one or more coprocessors, such as a mathematics coprocessor or an integrated graphical processing unit (GPU); and/or one or more layers of local cache memory. The computer 504 may comprise memory 602 storing various forms of applications, such as an operating system 604; one or more computer applications 606; and/or various forms of data, such as a database 608 or a file system. The computer 604 may comprise a variety of peripheral components, such as a wired and/or wireless network adapter 614 connectible to a local area network and/or wide area network; one or more storage components 616, such as a hard disk drive, a solid-state storage device (SSD), a flash memory device, and/or a magnetic and/or optical disk reader.

The computer 604 may comprise a mainboard featuring one or more communication buses 612 that interconnect the processor 610, the memory 602, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 612 may interconnect the computer 604 with at least one other computer. Other components that may optionally be included with the computer 604 (though not shown in the schematic architecture diagram 600 of FIG. 6) include a display; a display adapter, such as a graphical processing unit (GPU); input peripherals, such as a keyboard and/or mouse; and a flash memory device that may store a basic input/output system (BIOS) routine that facilitates booting the computer 604 to a state of readiness.

The computer 604 may operate in various physical enclosures, such as a desktop or tower, and/or may be integrated with a display as an "all-in-one" device. The computer 604 may be mounted horizontally and/or in a cabinet or rack, and/or may simply comprise an interconnected set of components. The computer 604 may comprise a dedicated and/or shared power supply 618 that supplies and/or regulates power for the other components. The computer 604 may provide power to and/or receive power from another computer and/or other devices. The computer 604 may comprise a shared and/or dedicated climate control unit 620 that regulates climate properties, such as temperature, humidity, and/or airflow. Many such computers 604 may be configured and/or adapted to utilize at least a portion of the techniques presented herein.

Figure 7:
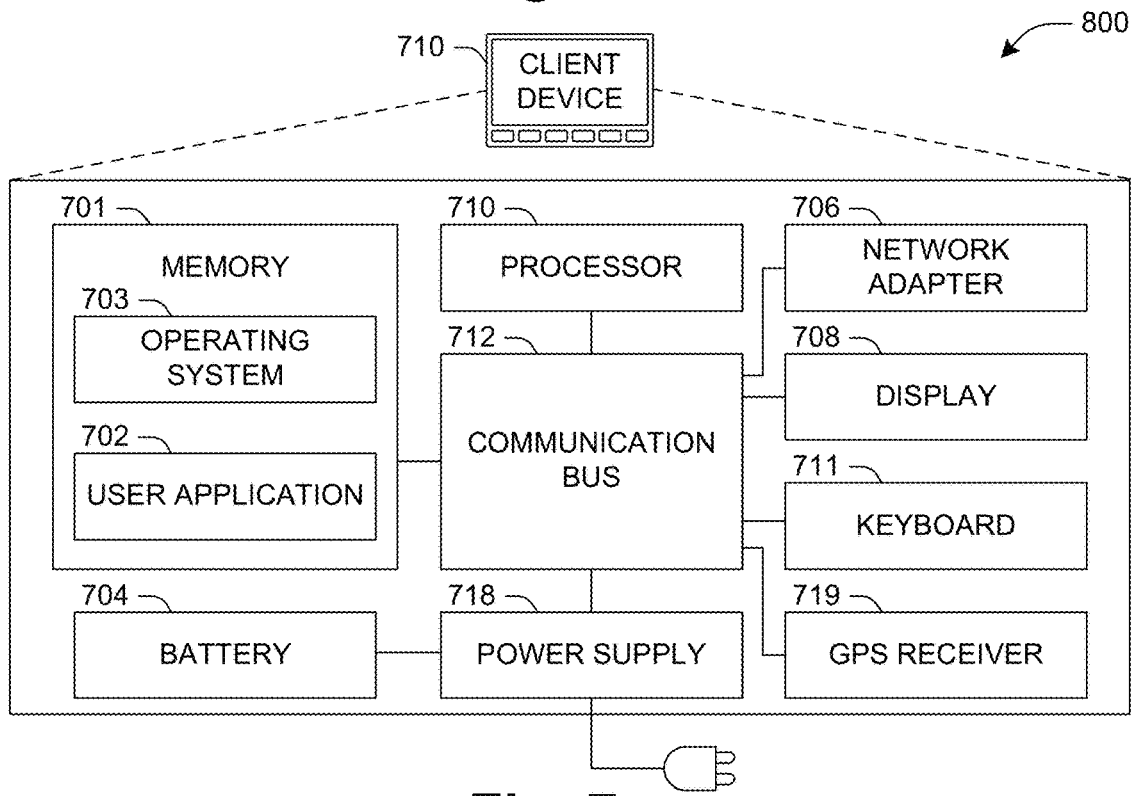
FIG. 7 is an illustration of a scenario involving an example configuration of a client that may utilize and/or implement at least a portion of the techniques presented herein.

FIG. 7 presents a schematic architecture diagram 700 of a client device 710 whereupon at least a portion of the techniques presented herein may be implemented. Such a client device 710 may vary widely in configuration or capabilities, in order to provide a variety of functionality to a user such as the user 512. The client device 710 may be provided in a variety of form factors, such as a desktop or tower workstation; an "all-in-one" device integrated with a display 708; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 710 may serve the user in a variety of roles, such as a workstation, kiosk, media player, gaming device, and/or appliance.

The client device 710 may comprise one or more processors 709 that process instructions. The one or more processors 709 may optionally include a plurality of cores; one or more coprocessors, such as a mathematics coprocessor or an integrated graphical processing unit (GPU); and/or one or more layers of local cache memory. The client device 710 may comprise memory 701 storing various forms of applications, such as an operating system 703; one or more user applications 702, such as document applications, media applications, file and/or data access applications, communication applications such as web browsers and/or email clients, utilities, and/or games; and/or drivers for various peripherals. The client device 710 may comprise a variety of peripheral components, such as a wired and/or wireless network adapter 706 connectible to a local area network and/or wide area network; one or more output components, such as a display 708 coupled with a display adapter (optionally including a graphical processing unit (GPU)), a sound adapter coupled with a speaker, and/or a printer; input devices for receiving input from the user, such as a keyboard 711, a mouse, a microphone, a camera, and/or a touch-sensitive component of the display 708; and/or environmental sensors, such as a global positioning system (GPS) receiver 719 that detects the location, velocity, and/or acceleration of the client device 710, a compass, accelerometer, and/or gyroscope that detects a physical orientation of the client device 710. Other components that may optionally be included with the client device 710 (though not shown in the schematic architecture diagram 700 of FIG. 7) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 710 to a state of readiness; and a climate control unit that regulates climate properties, such as temperature, humidity, and airflow.

The client device 710 may comprise a mainboard featuring one or more communication buses 712 that interconnect the processor 709, the memory 701, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 710 may comprise a dedicated and/or shared power supply 718 that supplies and/or regulates power for other components, and/or a battery 704 that stores power for use while the client device 710 is not connected to a power source via the power supply 718. The client device 710 may provide power to and/or receive power from other client devices.

Figure 8:
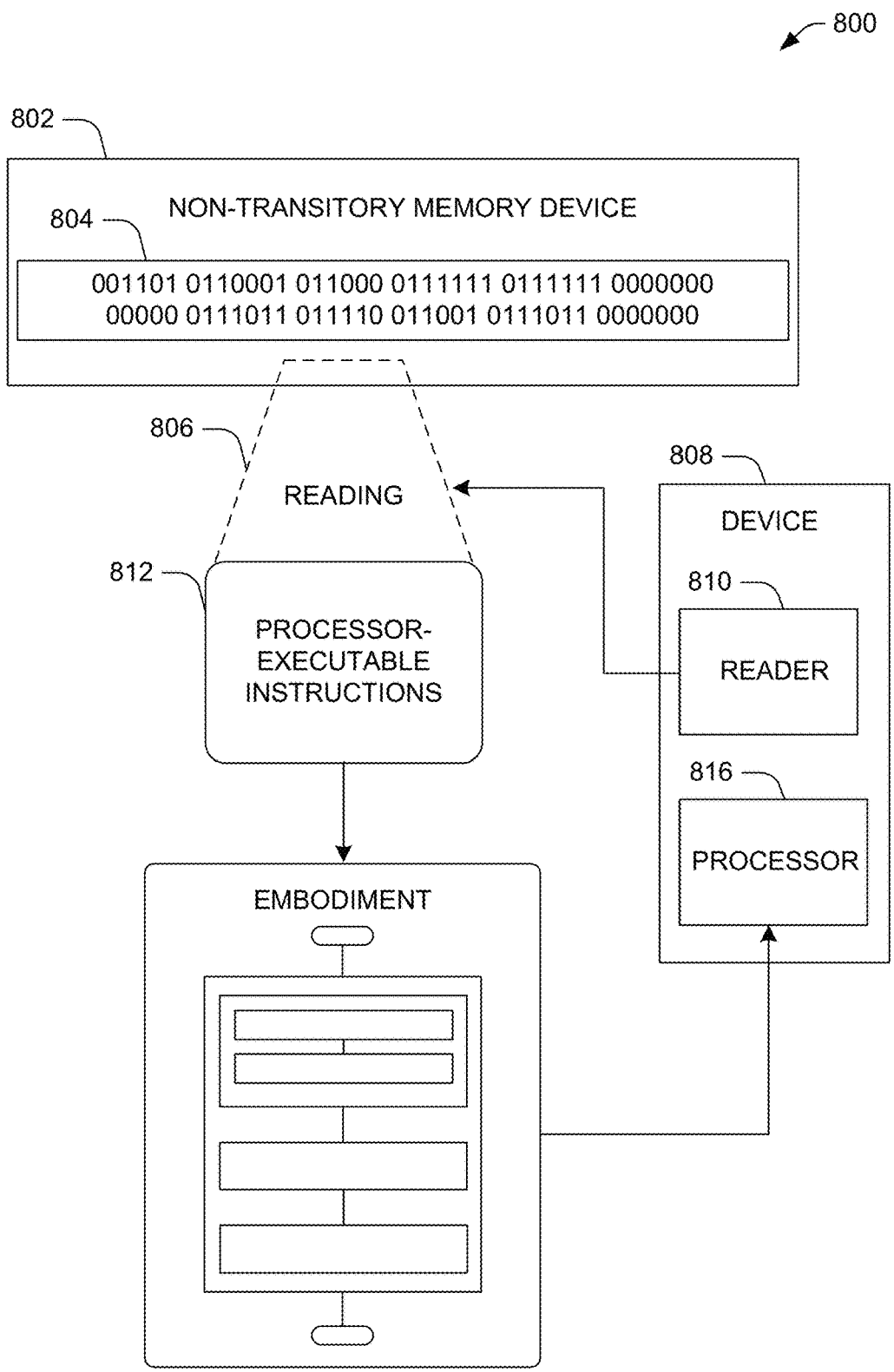
FIG. 8 is an illustration of a scenario featuring an example non-transitory machine readable medium in accordance with one or more of the provisions set forth herein.

FIG. 8 is an illustration of a scenario 800 involving an example non-transitory machine-readable medium 802. The non-transitory machine readable medium 802 may comprise processor-executable instructions 812 that when executed by a processor 816 cause performance (e.g., by the processor 816) of at least some of the provisions herein. The non-transitory machine readable medium 802 may comprise a memory semiconductor (e.g., a semiconductor utilizing static random access memory (SRAM), dynamic random access memory (DRAM), and/or synchronous dynamic random-dom access memory (SDRAM) technologies), a platter of a hard disk drive, a flash memory device, or a magnetic or optical disc (such as a compact disk (CD), a digital versatile disk (DVD), or floppy disk). The example non-transitory machine-readable medium 802 stores machine-readable data 804 that, when subjected to reading 806 by a reader 810 of a device 808 (e.g., a read head of a hard disk drive, or a read operation invoked on a solid-state storage device), express the processor-executable instructions 812. In some embodiments, the processor-executable instructions 812, when executed cause performance of operations, such as at least some of the example method 400 of FIG. 4, for example. In some embodiments, the processor-executable instructions 812 are configured to cause implementation of a system.

Figure 9:
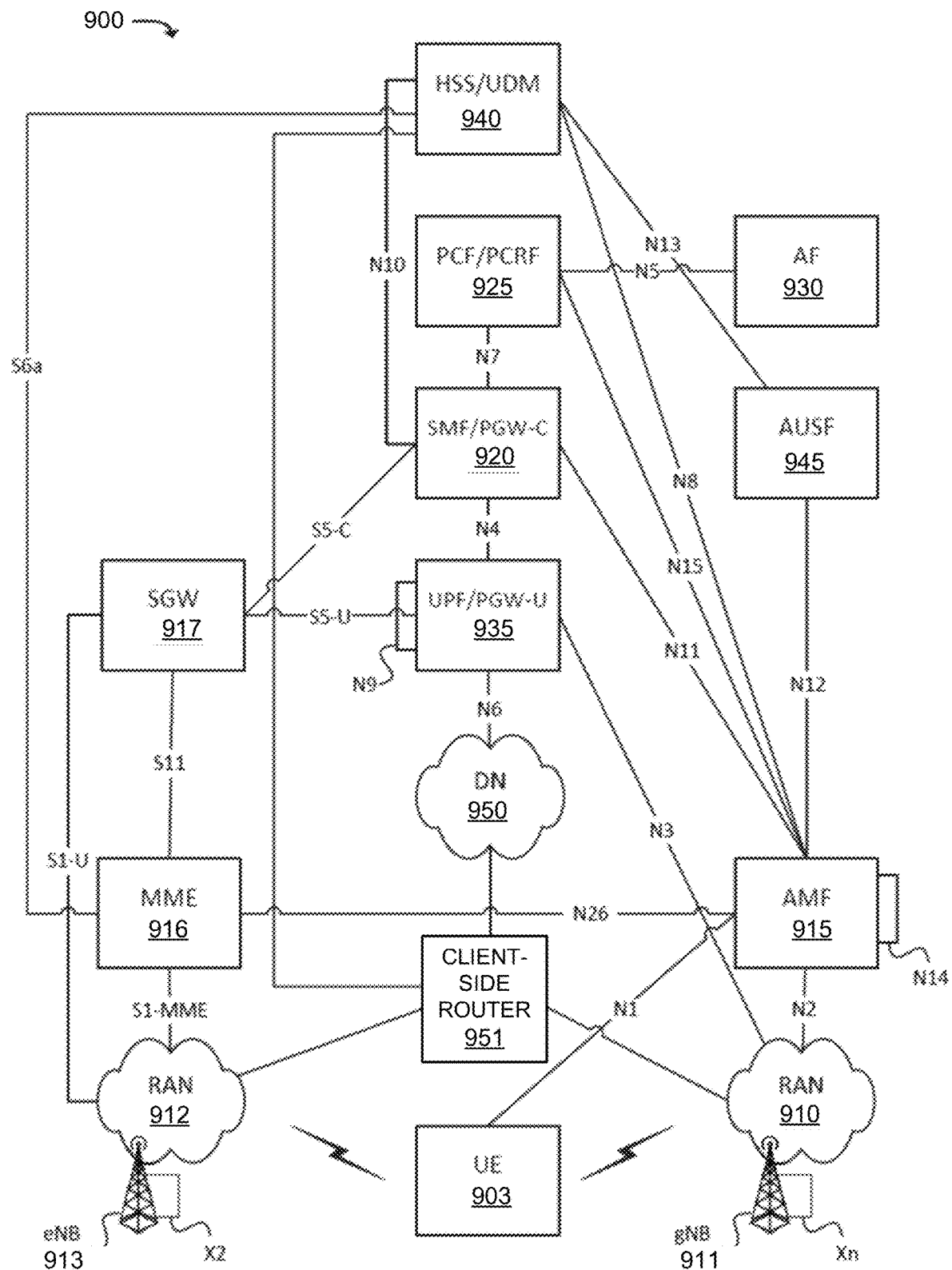
FIG. 9 is an illustration of an example environment in which at least a portion of the techniques presented herein may be utilized and/or implemented.

FIG. 9 illustrates an example environment 900, in which one or more embodiments may be implemented. In some embodiments, environment 900 may correspond to a Fifth Generation ("5G") network, and/or may include elements of a 5G network. In some embodiments, environment 900 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 900 may include UE 903, RAN 910 (which may include one or more Next Generation Node Bs ("gNBs") 911), RAN 912 (which may include one or more one or more evolved Node Bs ("eNBs") 913), and various network functions such as Access and Mobility Management Function ("AMF") 915, Mobility Management Entity ("MME") 916, Serving Gateway ("SGW") 917, Session Management Function ("SMF")/Packet Data Network ("PDN") Gateway ("PGW")-Control plane function ("PGW-C") 920, Policy Control Function ("PCF")/Policy Charging and Rules Function ("PCRF") 925, Application Function ("AF") 930, User Plane Function ("UPF")/PGW-User plane function ("PGW-U") 935, Home Subscriber Server ("HSS")/Unified Data Management ("UDM") 940, and Authentication Server Function ("AUSF") 945. Environment 900 may also include one or more networks, such as Data Network ("DN") 950. Environment 900 may include one or more additional devices or systems communicatively coupled to one or more networks (e.g., DN 950), such as client-side router 951.

The example shown in FIG. 9 illustrates one instance of each network component or function (e.g., one instance of SMF/PGW-C 920, PCF/PCRF 925, UPF/PGW-U 935, HSS/UDM 940, and/or 945). In practice, environment 900 may include multiple instances of such components or functions. For example, in some embodiments, environment 900 may include multiple "slices" of a core network, where each slice includes a discrete set of network functions (e.g., one slice may include a first instance of SMF/PGW-C 920, PCF/PCRF 925, UPF/PGW-U 935, HSS/UDM 940, and/or 945, while another slice may include a second instance of SMF/

PGW-C 920, PCF/PCRF 925, UPF/PGW-U 935, HSS/UDM 940, and/or 945). The different slices may provide differentiated levels of service, such as service in accordance with different Quality of Service ("QoS") parameters.

The quantity of devices and/or networks, illustrated in FIG. 9, is provided for explanatory purposes only. In practice, environment 900 may include additional devices and/or networks, fewer devices and/or networks, different devices and/or networks, or differently arranged devices and/or networks than illustrated in FIG. 9. For example, while not shown, environment 900 may include devices that facilitate or enable communication between various components shown in environment 900, such as routers, modems, gateways, switches, hubs, etc. Alternatively and/or additionally, one or more of the devices of environment 900 may perform one or more network functions described as being performed by another one or more of the devices of environment 900. Devices of environment 900 may interconnect with each other and/or other devices via wired connections, wireless connections, or a combination of wired and wireless connections. In some implementations, one or more devices of environment 900 may be physically integrated in, and/or may be physically attached to, one or more other devices of environment 900.

UE 903 may include a computation and communication device, such as a wireless mobile communication device that is capable of communicating with RAN 910, RAN 912, and/or DN 950. UE 903 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, an Internet of Things ("IoT") device, a Mobile-to-Mobile ("M2M") device, or another type of mobile computation and communication device. UE 903 may send traffic to and/or receive traffic (e.g., user plane traffic) from DN 950 via RAN 910, RAN 912, and/or UPF/PGW-U 935.

RAN 910 may be, or may include, a 5G RAN that includes one or more base stations (e.g., one or more gNBs 911), via which UE 903 may communicate with one or more other elements of environment 900. UE 903 may communicate with RAN 910 via an air interface (e.g., as provided by gNB 911). For instance, RAN 910 may receive traffic (e.g., voice call traffic, data traffic, messaging traffic, signaling traffic, etc.) from UE 903 via the air interface, and may communicate the traffic to UPF/PGW-U 935, and/or one or more other devices or networks. Similarly, RAN 910 may receive traffic intended for UE 903 (e.g., from UPF/PGW-U 935, AMF 915, and/or one or more other devices or networks) and may communicate the traffic to UE 903 via the air interface.

RAN 912 may be, or may include, a LTE RAN that includes one or more base stations (e.g., one or more eNBs 913), via which UE 903 may communicate with one or more other elements of environment 900. UE 903 may communicate with RAN 912 via an air interface (e.g., as provided by eNB 913). For instance, RAN 910 may receive traffic (e.g., voice call traffic, data traffic, messaging traffic, signaling traffic, etc.) from UE 903 via the air interface, and may communicate the traffic to UPF/PGW-U 935, and/or one or more other devices or networks. Similarly, RAN 910 may receive traffic intended for UE 903 (e.g., from UPF/PGW-U 935, SGW 917, and/or one or more other devices or networks) and may communicate the traffic to UE 903 via the air interface.

AMF 915 may include one or more devices, systems, Virtualized Network Functions ("VNFs"), etc., that perform operations to register UE 903 with the 5G network, to establish bearer channels associated with a session with UE 903, to hand off UE 903 from the 5G network to another network, to hand off UE 903 from the other network to the 5G network, manage mobility of UE 903 between RANs 910 and/or gNBs 911, and/or to perform other operations. In some embodiments, the 5G network may include multiple AMFs 915, which communicate with each other via the N14 interface (denoted in FIG. 9 by the line marked "N14" originating and terminating at AMF 915).

MME 916 may include one or more devices, systems, VNFs, etc., that perform operations to register UE 903 with the EPC, to establish bearer channels associated with a session with UE 903, to hand off UE 903 from the EPC to another network, to hand off UE 903 from another network to the EPC, manage mobility of UE 903 between RANs 912 and/or eNBs 913, and/or to perform other operations.

SGW 917 may include one or more devices, systems, VNFs, etc., that aggregate traffic received from one or more eNBs 913 and send the aggregated traffic to an external network or device via UPF/PGW-U 935. Additionally, SGW 917 may aggregate traffic received from one or more UPF/PGW-Us 935 and may send the aggregated traffic to one or more eNBs 913. SGW 917 may operate as an anchor for the user plane during inter-eNB handovers and as an anchor for mobility between different telecommunication networks or RANs (e.g., RANs 910 and 912).

SMF/PGW-C 920 may include one or more devices, systems, VNFs, etc., that gather, process, store, and/or provide information in a manner described herein. SMF/PGW-C 920 may, for example, facilitate in the establishment of communication sessions on behalf of UE 903. In some embodiments, the establishment of communications sessions may be performed in accordance with one or more policies provided by PCF/PCRF 925.

PCF/PCRF 925 may include one or more devices, systems, VNFs, etc., that aggregate information to and from the 5G network and/or other sources. PCF/PCRF 925 may receive information regarding policies and/or subscriptions from one or more sources, such as subscriber databases and/or from one or more users (such as, for example, an administrator associated with PCF/PCRF 925).

AF 930 may include one or more devices, systems, VNFs, etc., that receive, store, and/or provide information that may be used in determining parameters (e.g., quality of service parameters, charging parameters, or the like) for certain applications.

UPF/PGW-U 935 may include one or more devices, systems, VNFs, etc., that receive, store, and/or provide data (e.g., user plane data). For example, UPF/PGW-U 935 may receive user plane data (e.g., voice call traffic, data traffic, etc.), destined for UE 903, from DN 950, and may forward the user plane data toward UE 903 (e.g., via RAN 910, SMF/PGW-C 920, and/or one or more other devices). In some embodiments, multiple UPFs 935 may be deployed (e.g., in different geographical locations), and the delivery of content to UE 903 may be coordinated via the N9 interface (e.g., as denoted in FIG. 9 by the line marked "N9" originating and terminating at UPF/PGW-U 935). Similarly, UPF/PGW-U 935 may receive traffic from UE 903 (e.g., via RAN 910, SMF/PGW-C 920, and/or one or more other devices), and may forward the traffic toward DN 950. In some embodiments, UPF/PGW-U 935 may communicate (e.g., via the N4 interface) with SMF/PGW-C 920, regarding user plane data processed by UPF/PGW-U 935.

HSS/UDM 940 and AUSF 945 may include one or more devices, systems, VNFs, etc., that manage, update, and/or store, in one or more memory devices associated with AUSF 945 and/or HSS/UDM 940, profile information associated with a subscriber. AUSF 945 and/or HSS/UDM 940 may perform authentication, authorization, and/or accounting operations associated with the subscriber and/or a communication session with UE 903.

DN 950 may include one or more wired and/or wireless networks. For example, DN 950 may include an Internet Protocol ("IP")-based PDN, a wide area network ("WAN") such as the Internet, a private enterprise network, and/or one or more other networks. UE 903 may communicate, through DN 950, with data servers, other UEs UE 903, and/or to other servers or applications that are coupled to DN 950. DN 950 may be connected to one or more other networks, such as a public switched telephone network ("PSTN"), a public land mobile network ("PLMN"), and/or another network. DN 950 may be connected to one or more devices, such as content providers, applications, web servers, and/or other devices, with which UE 903 may communicate.

The client-side router 951 may include one or more devices, systems, VNFs, etc., that perform one or more operations described herein. For example, the client-side router 951 may monitor and/or analyze video stream chunks and/or statuses associated with video stream chunks to check for quality issues and/or may deliver video stream chunks to UE 903.

Figure 10:
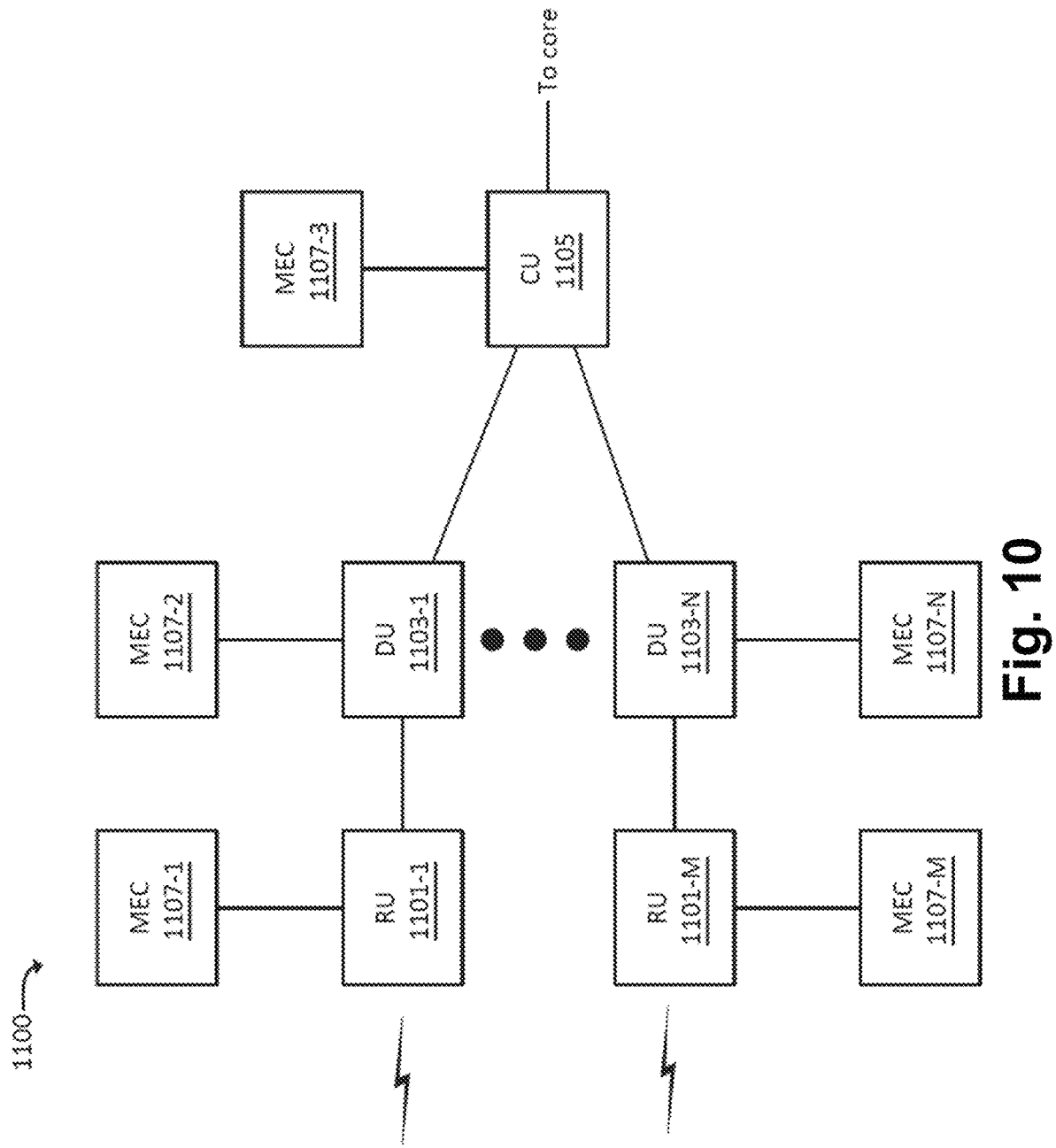
FIG. 10 is an illustration of an example network that may utilize and/or implement at least a portion of the techniques presented herein.

FIG. 10 illustrates an example Distributed Unit ("DU") network 1100, which may be included in and/or implemented by one or more RANs (e.g., RAN 910, RAN 912, or some other RAN). In some embodiments, a particular RAN may include one DU network 1100. In some embodiments, a particular RAN may include multiple DU networks 1100. In some embodiments, DU network 1100 may correspond to a particular gNB 911 of a 5G RAN (e.g., RAN 910). In some embodiments, DU network 1100 may correspond to multiple gNBs 911. In some embodiments, DU network 1100 may correspond to one or more other types of base stations of one or more other types of RANs. As shown, DU network 1100 may include Central Unit ("CU") 1105, one or more Distributed Units ("DUs") 1103-1 through 1103-N (referred to individually as "DU 1103," or collectively as "DUs 1103"), and one or more Radio Units ("RUs") 1101-1 through 1101-M (referred to individually as "RU 1101," or collectively as "RUs 1101").

CU 1105 may communicate with a core of a wireless network (e.g., may communicate with one or more of the devices or systems described above with respect to FIG. 10, such as AMF 915 and/or UPF/PGW-U 935). In the uplink direction (e.g., for traffic from UEs UE 903 to a core network), CU 1105 may aggregate traffic from DUs 1103, and forward the aggregated traffic to the core network. In some embodiments, CU 1105 may receive traffic according to a given protocol (e.g., Radio Link Control ("RLC")) from DUs 1103, and may perform higher-layer processing (e.g., may aggregate/process RLC packets and generate Packet Data Convergence Protocol ("PDCP") packets based on the RLC packets) on the traffic received from DUs 1103.

In accordance with some embodiments, CU 1105 may receive downlink traffic (e.g., traffic from the core network) for a particular UE 903, and may determine which DU(s) 1103 should receive the downlink traffic. DU 1103 may include one or more devices that transmit traffic between a core network (e.g., via CU 1105) and UE 903 (e.g., via a respective RU 1101). DU 1103 may, for example, receive traffic from RU 1101 at a first layer (e.g., physical ("PHY") layer traffic, or lower PHY layer traffic), and may process/aggregate the traffic to a second layer (e.g., upper PHY and/or RLC). DU 1103 may receive traffic from CU 1105 at the second layer, may process the traffic to the first layer, and provide the processed traffic to a respective RU 1101 for transmission to UE 903.

RU 1101 may include hardware circuitry (e.g., one or more RF transceivers, antennas, radios, and/or other suitable hardware) to communicate wirelessly (e.g., via an RF interface) with one or more UEs UE 903, one or more other DUs 1103 (e.g., via RUs 1001 associated with DUs 1103), and/or any other suitable type of device. In the uplink direction, RU 1101 may receive traffic from UE 903 and/or another DU 1103 via the RF interface and may provide the traffic to DU 1103. In the downlink direction, RU 1101 may receive traffic from DU 1103, and may provide the traffic to UE 903 and/or another DU 1103.

RUs 1101 may, in some embodiments, be communicatively coupled to one or more Multi-Access/Mobile Edge Computing ("MEC") devices, referred to sometimes herein simply as ("MECs") 1107. For example, RU 1101-1 may be communicatively coupled to MEC 1107-1, RU 1101-M may be communicatively coupled to MEC 1107-M, DU 1103-1 may be communicatively coupled to MEC 1107-2, DU 1103-N may be communicatively coupled to MEC 1107-N, CU 1105 may be communicatively coupled to MEC 1107-3, and so on. MECs 1107 may include hardware resources (e.g., configurable or provisionable hardware resources) that may be configured to provide services and/or otherwise process traffic to and/or from UE 903, via a respective RU 1101.

For example, RU 1101-1 may route some traffic, from UE 903, to MEC 1107-1 instead of to a core network (e.g., via DU 1103 and CU 1105). MEC 1107-1 may process the traffic, perform one or more computations based on the received traffic, and may provide traffic to UE 903 via RU 1101-1. In this manner, ultra-low latency services may be provided to UE 903, as traffic does not need to traverse DU 1103, CU 1105, and an intervening backhaul network between DU network 1100 and the core network. In some embodiments, MEC 1107 may include, and/or may implement some or all of the functionality described above with respect to the client-side router 951.

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering may be implemented without departing from the scope of the disclosure. Further, it will be understood that not all operations are necessarily present in each embodiment provided herein. Also, it will be understood that not all operations are necessary in some embodiments.

Also, although the disclosure has been shown and described with respect to one or more implementations, alterations and modifications may be made thereto and additional embodiments may be implemented based upon a reading and understanding of this specification and the annexed drawings. The disclosure includes all such modifications, alterations and additional embodiments and is limited only by the scope of the following claims. The specification and drawings are accordingly to be regarded in an illustrative rather than restrictive sense. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A system, comprising:
    a first data store configured to store first data comprising a first identifier field;
    a second data store configured to store second data comprising a second identifier field;
    a third data store comprising microdatabases; and
    a processor configured to execute instructions to perform operations comprising:
        generating a first relationship record that relates a first value of the first identifier field stored in the first data store to a first value of the second identifier field stored in second first data store;
        generating a second relationship record that relates a second value of the first identifier field stored in the first data store to a second value of the second identifier field stored in second first data store;
        generating a first key map record for the first relationship record;
        generating a second key map record for the second relationship record;
        performing a first linking of the first key map record to a first microdatabase of the microdatabases;
        performing a second linking of the second key map record to a second microdatabase of the microdatabases;
        loading the first microdatabase with a first portion of the first data from the first data store and a first portion of the second data from the second data store based upon the first linking;
        loading the second microdatabase with a second portion of the first data from the first data store and a second portion of the second data from the second data store based upon the second linking;
        receiving a query comprising an identifier value;
        making a first determination that the first microdatabase, loaded with data from the first data store and the second data store in association with the first linking, is associated with the query based on the identifier value and the first key map record; and
        retrieving data from the first microdatabase based upon the first determination.

2. The system of claim 1, comprising:
    a fourth data store configured to store the first key map record and the second key map record, wherein:
        the fourth data store is separate from the first data store and the second data store.

3. The system of claim 1, the operations comprising:
    generating a first unique identifier for the first value in the first identifier field linked to the first value in the second identifier field based on the first relationship record; and
    generating a second unique identifier for the second value in the first identifier field linked to the second value in the second identifier field based on the second relationship record.

4. The system of claim 3, the operations comprising:
    generating a load data set comprising:
        a third identifier field storing the first value of the first identifier field, the first value of the second identifier field, the first value of the first identifier field; and the second value of the second identifier field;
        the first portion of the first data from the first data store linked to the first value of the first identifier field;

the first portion of the second data from the second data store linked to the first value of the second identifier field;

the second portion of the first data from the first data store linked to the second value of the first identifier field; and the second portion of the second data from the second data store linked to the second value of the second identifier field;

transforming one of the first value of the first identifier field in the third identifier field or the first value of the second identifier field in the third identifier field based on the first unique identifier;

transforming one of the second value of the first identifier field in the third identifier field or the second value of the second identifier field in the third identifier field based on the second unique identifier; and sorting the load data set based on the third identifier field to generate a sorted load data set.

5. The system of claim 4, wherein:

loading the first microdatabase comprises loading the first microdatabase with the first portion of the first data from the first data store and the first portion of the second data from the second data store from the sorted load data set; and loading the second microdatabase comprises loading the second microdatabase with the second portion of the first data from the first data store and the second portion of the second data from the second data store from the sorted load data set.

6. The system of claim 1, wherein:

the first data store comprises a first database topology; and the second data store comprises a second database topology different than the first database topology.

7. The system of claim 1, the operations comprising:

performing a validation on the first portion of the first data; and modifying at least one element of the first portion of the first data based on a cleansing rule responsive to a failure of the validation.

8. The system of claim 1, the operations comprising:

making a second determination that the second microdatabase is not associated with the query based on the identifier value and the second key map record; and refraining from retrieving data from the second microdatabase based upon the second determination.

9. The system of claim 1, wherein:

the first key map record comprises an access key; and retrieving data from the first microdatabase comprises retrieving data from the first microdatabase using the access key.

10. A method comprising:

retrieving first data from a first data store having a first database topology and second data from a second data store having a second database topology different than the first database topology;

storing the first data and the second data in a load data set;

sorting the load data set based on a first identifier field in the load data set to generate a first portion of the first data associated with a first value of the first identifier field, a first portion of the second data associated with the first value of the first identifier field, a second portion of the first data associated with a second value of the first identifier field, and a second portion of the second data associated with the second value of the first identifier field;

loading a first microdatabase with the first portion of the first data from the first data store and the first portion of the second data from the second data store;

loading a second microdatabase with the second portion of the first data from the first data store and the second portion of the second data from the second data store;

generating a first key map record comprising a first access key for the first microdatabase, loaded with data from the first data store and the second data store, and linking the first value of the first identifier field to the first microdatabase;

generating a second key map record comprising a second access key for the second microdatabase, loaded with data from the first data store and the second data store, and linking the second value of the first identifier field to the second microdatabase;

receiving a query comprising an identifier value;

making a first determination that the first microdatabase is associated with the query based on the identifier value and the first key map record; and retrieving data from the first microdatabase based upon the first determination using the first access key.

11. The method of claim 10, comprising:

making a second determination that the second microdatabase is not associated with the query based on the identifier value and the second key map record.

12. The method of claim 11, comprising:

refraining from retrieving data from the second microdatabase based upon the second determination.

13. The method of claim 10, comprising:

storing the first microdatabase and the second microdatabase in a third data store; and storing the first key map record and the second key map record in a fourth data store separate from the third data store.

14. The method of claim 10, comprising:

storing one of a second identifier field in the first data store or a third identifier field in the second data store as the first identifier field in the load data set.

15. The method of claim 10, wherein:

generating the first key map record comprises generating the first key map record linking one of a first value of a second identifier field in the first data store or a first value of a third identifier field in the second data store to the first value of the first identifier field in the load data set.

16. The method of claim 10, comprising:

performing a validation on the first portion of the first data; and modifying at least one element of the first portion of the first data based on a cleansing rule responsive to a failure of the validation.

17. A non-transitory computer-readable medium, storing instructions thereon that when executed by a processor cause the processor to:

retrieve first data from a first data store having a first database topology and second data from a second data store having a second database topology different than the first database topology;

store the first data and the second data in a load data set;

sort the load data set based on a first identifier field in the load data set to generate a first portion of the first data associated with a first value of the first identifier field, a first portion of the second data associated with the first value of the first identifier field, a second portion of the first data associated with a second value of the first identifier field, and a second portion of the second data associated with the second value of the first identifier field;

load a first microdatabase with the first portion of the first data from the first data store and the first portion of the second data from the second data store;

load a second microdatabase with the second portion of the first data from the first data store and the second portion of the second data from the second data store;

generate a first key map record comprising a first access key for the first microdatabase, loaded with data from the first data store and the second data store, and linking the first value of the first identifier field to the first microdatabase;

generate a second key map record comprising a second access key for the second microdatabase, loaded with data from the first data store and the second data store, and linking the second value of the first identifier field to the second microdatabase;

receive a query comprising an identifier value;

make a first determination that the first microdatabase is associated with the query based on the identifier value and the first key map record; and retrieve data from the first microdatabase using the first access key based upon the first determination.

18. The non-transitory computer-readable medium of claim 17, wherein the processor is to:

make a second determination that the second microdatabase is not associated with the query based on the identifier value and the second key map record.

19. The non-transitory computer-readable medium of claim 18, wherein the processor is to:

refrain from retrieving data from the second microdatabase based upon the second determination.

20. The non-transitory computer-readable medium of claim 17, wherein the processor is to:

store one of a second identifier field in the first data store or a third identifier field in the second data store as the first identifier field in the load data set.

* * * * *